April 1, 1941.  W. S. BRINK  2,237,247
WHEEL CONSTRUCTION
Filed March 16, 1939   2 Sheets-Sheet 1

INVENTOR
Winfield S. Brink
BY
Ely & Frye
ATTORNEYS

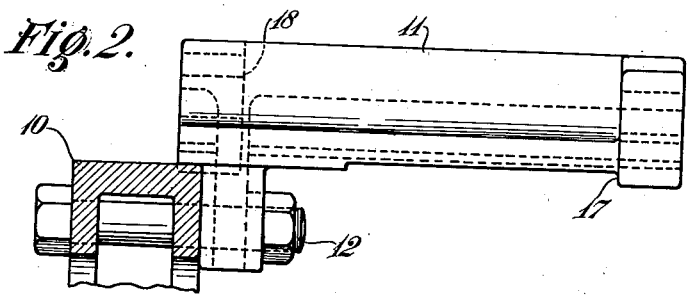
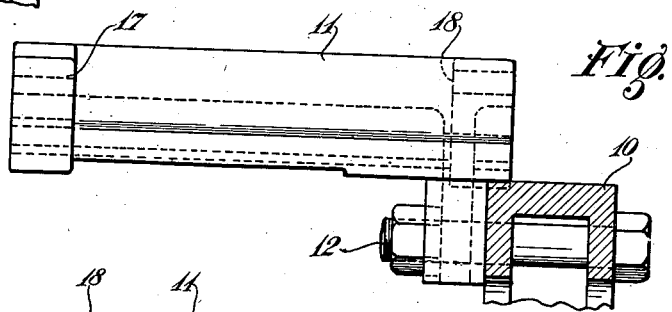
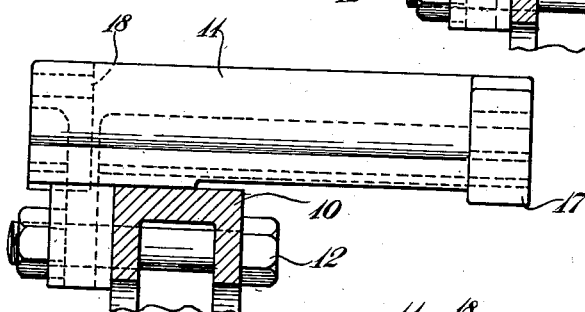
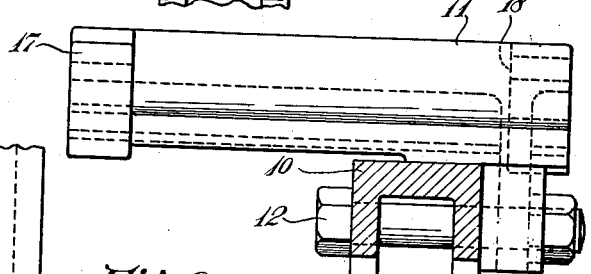
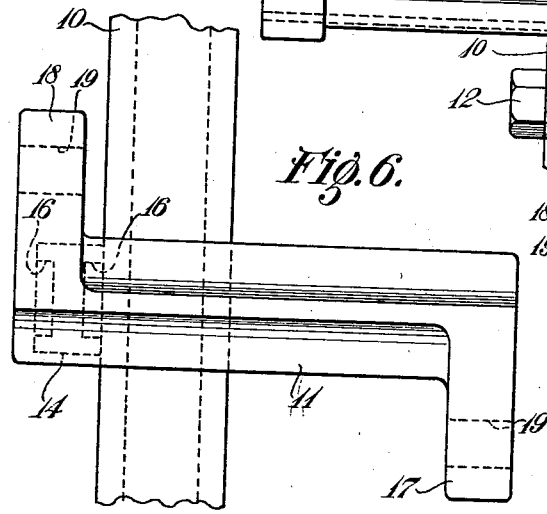
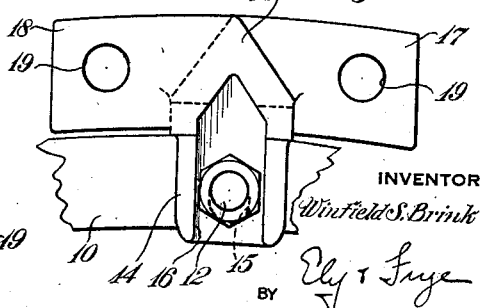

Patented Apr. 1, 1941

2,237,247

UNITED STATES PATENT OFFICE 2,237,247

WHEEL CONSTRUCTION

Winfield S. Brink, Akron, Ohio, assignor to The Firestone Tire & Rubber Company, Akron, Ohio, a corporation of Ohio Application March 16, 1939, Serial No. 262,169

2 Claims. (Cl. 301—13)

This invention relates to wheel constructions, and more specifically it relates to vehicle wheel constructions comprising dual tires, and including means whereby the tires of each wheel may be spaced different distances apart from each other, and whereby the tires on each wheel may be spaced as a unit alternatively at different positions laterally with relation to the central plane of the wheel to vary the tread width of the vehicle.

The invention is of primary utility in its application to the wheels of agricultural vehicles, such as tractors, and especially tractors that are used on farms employing the lister method of crop planting. In the discing, plowing, harrowing, planting, and harvesting of listed crops, the tires of the tractor are set at normal position, which is usually the narrowest tread position, the dual tires of each wheel being close together. For cultivating listed crops, the tires of each wheel are spaced wide apart from each other, and the overall tread width of the vehicle is adjusted to fit the rows.

The chief objects of the invention are to provide an improved mounting means for dual tire rims, which means is adapted to support said rims at different distances apart from each other; and which means is adapted to be mounted in a plurality of different positions laterally of the felloe of a vehicle wheel to vary the overall tread width of a vehicle. More specifically, the invention aims to provide an improved bracket that is mountable upon a wheel felloe for supporting dual tires; and to provide such a bracket wherein the strains imparted thereto by the two tires substantially balance each other. Other objects will be manifest as this description proceeds.

Of the accompanying drawings:

Figure 2 is a transverse section through a wheel felloe, and an improved bracket mounted thereon in one of its alternative positions;

Figure 1:
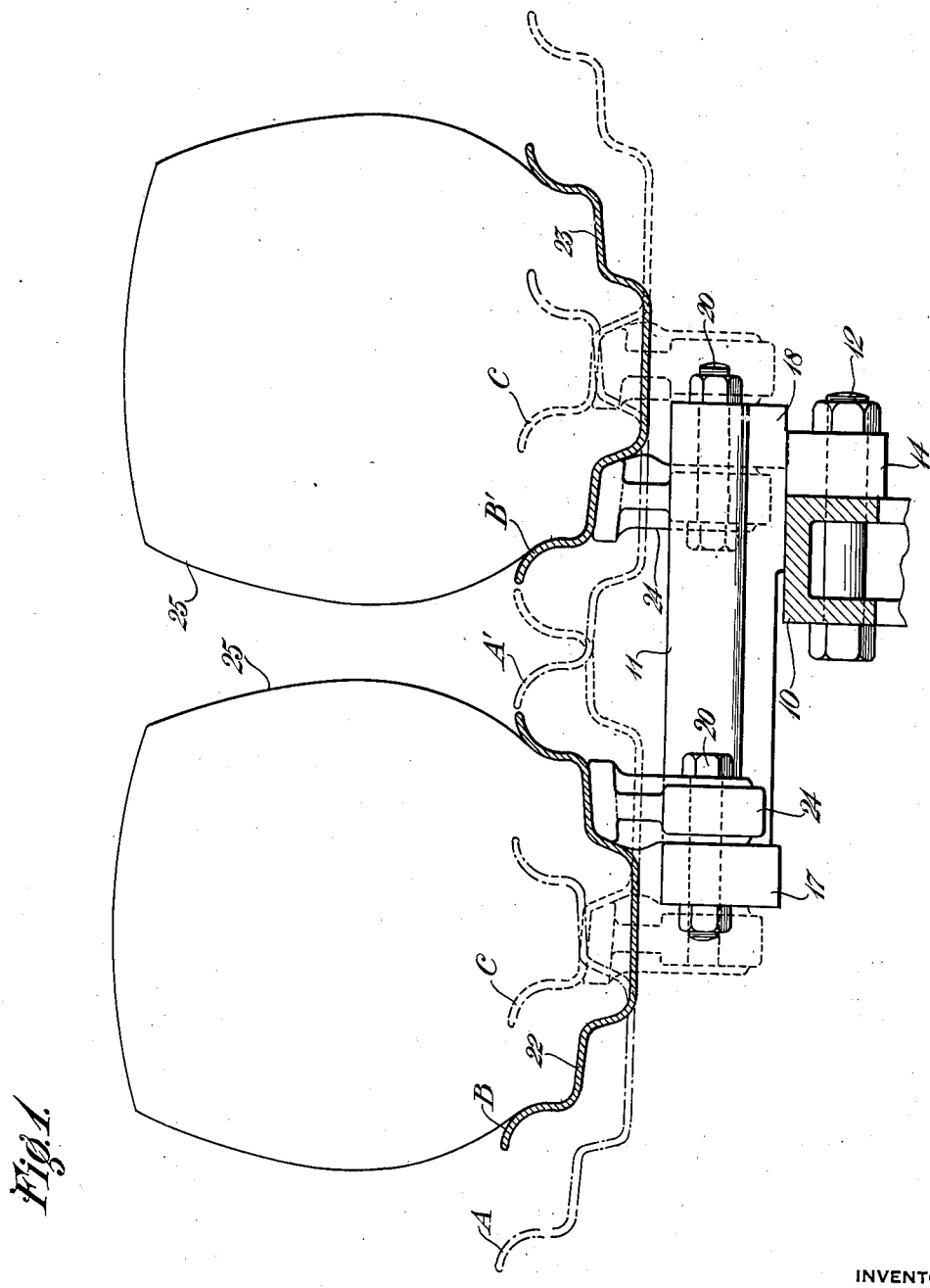
Figure 1 is a transverse section through a wheel felloe, a pair of dual tire rims, and an improved bracket mounted in one of its alternative positions upon said felloe and supporting said dual rims, alternative positions of the latter upon said bracket being indicated in broken lines.

Figures 3, 4, and 5 are views similar to Figure 2 showing the improved bracket mounted in other alternative positions with relation to the wheel felloe;

Figure 6 is a plan view of the structure shown in Figure 4; and

Figure 7 is an end elevation of the structures shown in Figures 4 and 6, as viewed from the left thereof.

Referring to the drawings, 10 designates a metal wheel felloe of channel shape, the spokes of the wheel being omitted for clearness of illustration. Mounted upon the felloe 10 are a plurality of the improved rim-supporting brackets, such as the bracket 11, there usually being eight of the brackets 11 to each wheel. The felloe 10 is suitably transversely drilled or bored to receive bolts 12 by which the respective brackets 11 are secured to the felloe, each bracket requiring but one bolt.

Each bracket 11 consists of an elongated body portion that is angular in transverse section, as is best shown in Figure 7, the edge or apex of the angle being disposed outermost when the bracket is mounted for use on a felloe. Formed on the base of the angular body structure, adjacent one end thereof and projecting at right angles therefrom is an attaching lug 14 that is formed with an elongated aperture 15 for receiving a bolt 12, said lug abutting a lateral face of the felloe 10 when the bracket is mounted thereon. Opposite faces of the lug 14 are recessed at 16 to receive the nut of a bolt 12 the arrangement being such as to prevent turning of the nut when the bolt is being tightened. At one end the bracket 11 is formed with an arm 17 that projects laterally in one direction, at right angles to the body structure, and at its other end is similarly formed with a parallel arm 18 that projects laterally in the opposite direction, said arms being circumferentially disposed with relation to the axis of the wheel. Arms 17, 18 are formed with respective apertures 19 for receiving bolts 20, Figure 1, by which tire rims are secured to the said bracket arms.

The arms 17, 18 of the bracket are symmetrically arranged with relation to the lug 14 so that the bracket may be mounted in reversed positions on the felloe, and also may be mounted upon opposite sides of the felloe. By having the attaching lug 14 adjacent one end of the bracket, the different mounting arrangements mentioned provide four different operative positions for each of the rim-supporting arms 17, 18, which positions are shown in Figures 2 to 5 inclusive.

Referring now to Figure 1 of the drawings, there is shown a bracket 11 mounted upon a felloe 10 in one of its alternative positions, and dual tire rims 22, 23 mounted upon the respective rim-supporting arms 17, 18 of said bracket. As shown, the rims 22, 23 are of the drop center type, and each has a plurality of lugs, such as the lugs 24, permanently secured thereto as by welding, said lugs being attached to each rim at one side of the central well thereof. The lugs 24 of each rim are usually eight in number, and equally spaced about the circumference of the rim so as to be registerable with respective arms 17 or 18 of the brackets 11. Said lugs are apertured to receive the bolts 20 by which they are secured to said bracket arms. Pneumatic tires mounted upon the rims 22, 23 are shown in outline at 25, 25.

The arrangement is such that the rims 22, 23 may be secured either to one side or the other of the bracket arms 17, 18. Furthermore, the rims may be reversed upon the bracket arms, and, because the lugs 24 are positioned laterally of the central plane of each rim, will result in different positioning of the rims. In this manner the rims may be positioned at different distances from each other, and also their positions may be altered laterally with relation to the wheel felloe 10. In Figure 1 of the drawings, one position of each rim 22, 23 is shown in full lines and two alternative positions are shown in broken lines. The three positions of rim 22 are designated A, B, and C respectively, and the three similar positions of rim 23 are designated A', B', and C'. When it is desired to operate with the tires 25 close to each other, the rims 22, 23 may occupy the respective positions A—A', B—B', or C—C', in which positions the rim-centers are nine inches apart. When wider spacing of the tires is desired, the rims may occupy the positions A—B', or B—C', in which positions the rim-centers are eleven inches apart. When still wider spacing is desired, as for cultivation of listed crops, the rims may occupy positions A—C' in which positions their center lines are thirteen inches apart.

The nine inch to thirteen inch dual center-to-center positions enumerated offer a limited choice of tread widths without alteration of the mounting brackets 11 upon the wheel felloes. Since the mounting brackets may be set on the felloe band in four different positions, it will be seen that the proper tread width and tire spacing may be obtained to suit most any kind of condition of service.

The invention is of relatively simple construction and is low in cost. The improved brackets make it readily possible to effect rapid change from one tire spacing or tread spacing to another, and achieve the other advantages set out in the foregoing statement of objects.

Modification may be resorted to without departing from the spirit of the invention, or the scope thereof as defined by the appended claims.

What is claimed is:

1. A wheel construction comprising a wheel having a peripheral felloe, a plurality of brackets, means for mounting the latter transversely upon the periphery of the felloe in two alternative positions thereon, which positions are spaced from each other axially of the felloe, each bracket including attaching means that is located nearer one of its ends than the other whereby the position of the bracket on the felloe may be reversed in each of said alternative positions, a pair of rim-supporting arms projecting laterally from each end of said bracket, and a pair of tire rims mountable in two alternative positions on each of said bracket arms, each tire rim being provided with attaching lugs at one side of its medial plane whereby the tire may be reversely mounted in each of its alternative positions upon said bracket arms.

2. A wheel construction comprising a wheel having a peripheral felloe having opposed side portions, a plurality of brackets, means associated with one end of said brackets for mounting said brackets upon said felloe with the centerlines of said brackets being displaced axially of said felloe, said means being adapted to be attached to either side of said felloe and to have said brackets extend axially in either direction therefrom, and a rim-supporting arm associated with each end of each of said brackets whereby rims can be mounted upon said brackets in alternate position to said felloe by changing the position of said brackets relative to said felloe.

WINFIELD S. BRINK.